United States Patent
Hirabayashi

(10) Patent No.: US 11,554,608 B2
(45) Date of Patent: *Jan. 17, 2023

(54) RUBBER COMPOSITION FOR TIRE AND WINTER TIRE USING THE SAME

(71) Applicant: Toyo Tire Corporation, Itami (JP)

(72) Inventor: Kazuya Hirabayashi, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 294 days.

This patent is subject to a terminal disclaimer.

(21) Appl. No.: 16/995,952

(22) Filed: Aug. 18, 2020

(65) Prior Publication Data
US 2021/0061007 A1    Mar. 4, 2021

(30) Foreign Application Priority Data
Aug. 28, 2019 (JP) ............................. JP2019-156026

(51) Int. Cl.
| | |
|---|---|
| *B60C 1/00* | (2006.01) |
| *C08G 83/00* | (2006.01) |
| *C08L 25/10* | (2006.01) |
| *C08K 3/04* | (2006.01) |
| *C08K 3/36* | (2006.01) |
| *C08K 9/02* | (2006.01) |

(52) U.S. Cl.
CPC .......... *B60C 1/0016* (2013.01); *C08G 83/007* (2013.01); *C08K 3/04* (2013.01); *C08K 3/36* (2013.01); *C08K 9/02* (2013.01); *C08L 25/10* (2013.01); *C08K 2201/003* (2013.01); *C08L 2205/18* (2013.01)

(58) Field of Classification Search
CPC .. B60C 1/00; C08L 25/10; C08K 3/04; C08K 3/36; C08K 9/02; C08G 83/00
USPC ....................................................... 523/156
See application file for complete search history.

(56) References Cited

U.S. PATENT DOCUMENTS

2019/0010311 A1* 1/2019 Yoshinaga ................ C08L 7/00

FOREIGN PATENT DOCUMENTS

| | | | |
|---|---|---|---|
| JP | 2014-034620 A | | 2/2014 |
| JP | 2014-34623 A | * | 2/2014 |
| JP | 2014-201629 A | * | 10/2014 |
| JP | 2014-201629 A | | 10/2014 |
| JP | 2018-24768 A | | 2/2018 |
| JP | 2018024768 A | * | 2/2018 |
| KR | 20050120027 A | | 12/2005 |
| WO | 2009/031686 A1 | | 3/2009 |
| WO | WO-2017154335 A1 | * | 9/2017 ............. B29C 64/00 |

OTHER PUBLICATIONS

Notice of Allowance dated Aug. 18, 2022, issued in U.S. Appl. No. 16/995,959 (13 pages).

* cited by examiner

*Primary Examiner* — Deve V Hall
(74) *Attorney, Agent, or Firm* — WHDA, LLP

(57) ABSTRACT

A rubber composition for a tire, which does not require the addition of a compound when synthesizing rubber component and the modification of a rubber component, and a winter tire using the rubber composition are provided. The rubber composition for a tire contains fine particles of rotaxane having a straight chain molecule, acyclic molecule clathrating the straight chain molecule and blocking groups arranged at both terminals of the straight chain molecule such that the cyclic molecule does not desorb from the straight chain molecule, covered with silica; a rubber component comprising styrene-butadiene rubber; and at least one of carbon black and silica, wherein the total content of the fine particles, the carbon black and the silica (excluding silica covering rotaxane) is 70 to 150 parts by mass per 100 parts by mass of the rubber component.

17 Claims, No Drawings

RUBBER COMPOSITION FOR TIRE AND WINTER TIRE USING THE SAME

TECHNICAL FIELD

The present invention relates to a rubber composition for a tire, and a winter tire using the rubber composition.

BACKGROUND ART

A winter tire is required to have braking performance (snow performance) when running on a snowy road surface. Improvement in flexibility at low temperature is required in a rubber composition in order to improve braking performance on a snowy road surface. On the other hand, a problem occurs such that when flexibility is improved, reinforcing property is deteriorated.

SUMMARY OF THE INVENTION

The present inventors have reached to add rotaxane to a rubber composition as a means for giving flexibility at low temperature to the rubber composition.

JP-A-2014-201629 and JP-A-2018-24768 describe a rubber composition having rotaxane added thereto as a rubber composition that is difficult to generate cracks. However, for obtaining the effect of rotaxane, the rotaxane had to be added when synthesizing a rubber component (polymerization stage) or a rubber component or a cyclic molecule of rotaxane had to be modified, in order to bond the rubber components to rotaxane.

In view of the above, an object of the present invention is to provide a rubber composition for a tire, which does not require the addition of a compound when synthesizing rubber component and the modification of a rubber component, and can improve snow performance while maintaining reinforcing property as compared with the conventional rubber composition for a tire, having only the general carbon black and silica as reinforcing filler added thereto, and a winter tire using the rubber composition.

To overcome the above problems, a rubber composition for a tire according to one embodiment of the present invention contains fine particles of rotaxane having a straight chain molecule, a cyclic molecule clathrating the straight chain molecule and blocking groups arranged at both terminals of the straight chain molecule such that the cyclic molecule does not desorb from the straight chain molecule, covered with silica, a rubber component comprising styrene-butadiene rubber, and at least one of carbon black and silica, wherein the total content of the fine particles, the carbon black and the silica (excluding silica covering rotaxane) is 70 to 150 parts by mass per 100 parts by mass of the rubber component.

The rotaxane may have a modifying group by caprolactone in the cyclic molecule.

The fine particles may have an average particle diameter of 1 to 50 μm.

The content of the fine particles may be 10 to 100 parts by mass per 100 parts by mass of the rubber components.

The content of the rotaxane may be 9.8 to 98 parts by mass per 100 parts by mass of the rubber components.

A winter tire according to one embodiment of the present invention uses the rubber composition in a tread part.

According to the rubber composition for a tire of the present invention, a pneumatic tire having improved snow performance while maintaining reinforcing property as compared with the conventional rubber composition for a tire can be obtained. Furthermore, the effect of rotaxane is obtained by adding fine particles of rotaxane covered with silica to an unvulcanized rubber as with other additives. As a result, the rotaxane is not required to be added during synthesis of the rubber components, and the rubber component is not required to be modified.

DETAILED DESCRIPTION OF THE INVENTION

Elements in the embodiment for carrying out the present invention are described in detail below.

The rubber composition for a tire according to the present embodiment contains fine particles of rotaxane having a straight chain molecule, a cyclic molecule clathrating the straight chain molecule and blocking groups arranged at both terminals of the straight chain molecule such that the cyclic molecule does not desorb from the straight chain molecule, covered with silica, a rubber component comprising styrene-butadiene rubber, and at least one of carbon black and silica, wherein the total content of the fine particles, the carbon black and the silica (excluding silica covering rotaxane) is 70 to 150 parts by mass per 100 parts by mass of the rubber component.

The rubber component according to the present embodiment includes styrene-butadiene rubber (SBR). However, the rubber component is not limited to this, and may further include natural rubber (NB), butadiene rubber (BR), isoprene rubber (IR), styrene-isoprene copolymer rubber, butadiene-isoprene copolymer rubber, styrene-isoprene-butadiene copolymer rubber, or a modified rubber obtained by modifying a part of terminals or main chains of those. Styrene-butadiene rubber, natural rubber and butadiene rubber are preferably used together. The styrene-butadiene rubber (SBR) includes modified SBR obtained by modifying a part of terminals and main chains of those.

When styrene-butadiene rubber, natural rubber and butadiene rubber are used together as the rubber component, the content of the styrene-butadiene rubber (SBR) in 100 parts by mass of the rubber component is not particularly limited, but is preferably 20 to 70 parts by mass and more preferably 30 to 60 parts by mass. The content of the natural rubber in 100 parts by mass of the rubber component is not particularly limited, but is preferably 20 to 60 parts by mass and more preferably 30 to 50 parts by mass. The content of the butadiene rubber in 100 parts by mass of the rubber component is not particularly limited, but is preferably 10 to 40 parts by mass and more preferably 10 to 30 parts by mass.

The rotaxane according to the present invention has a straight chain molecule, a cyclic molecule clathrating the straight chain molecule and blocking groups arranged at both terminals of the straight chain molecule such that the cyclic molecule does not desorb from the straight chain molecule. In the present description, the term "rotaxane" includes polyrotaxane having two or more cyclic molecules.

The straight chain molecule is not particularly limited, and examples thereof include polyalkyls, polyesters, polyethers, polyamides, polyacryls and a straight chain molecule having a benzene ring. Those may be contained alone and may be contained as mixtures of two or more kinds.

Examples of the polyalkyls include polyethylene, polypropylene, polyisoprene and polybutadiene. The polyesters, polyamides, straight chain molecule having a benzene ring and polyacryls can be common materials generally used.

Examples of the polyethers include polyethylene glycol, and the polyethylene glycol is suitably used from the standpoint of excellent clathration property of a cyclic molecule.

Weight average molecular weight of the straight chain molecule is not particularly limited, but is preferably 10,000 to 40,000, more preferably 15,000 to 35,000 and still more preferably 20,000 to 30,000.

The cyclic molecule is not particularly restricted so long as it has a cyclic structure, clathrates a straight chain molecule and produces a slide ring effect described hereinafter. In the present description, the "cyclic structure" is not always necessary to be a closed form. In other words, the cyclic molecule may substantially have a cyclic structure, like "C" character.

The cyclic molecule preferably has a reaction group. This facilitates to obtain interaction with silica and further facilitates to introduce a modifying group or the like. Examples of such a reaction group include a hydroxyl group, a carboxyl group, an amino group, an epoxy group, an isocyanate group, a thiol group and an aldehyde group, although not limited to those. The reaction group is preferably a group that does not react with a blocking group in the case of forming the blocking group described hereinafter (blocking reaction). Considering this point, the reaction group is preferably a hydroxyl group, an epoxy group or an amino group, and is particularly preferably a hydroxyl group.

Examples of the cyclic molecule specifically include cyclodextrin, crown ethers, benzo crowns, dibenzocrowns, dicyclohexanocrowns, and those derivatives or modified bodies. Of those, cyclodextrin and cyclodextrin derivatives are preferably used. The kind of cyclodextrin and cyclodextrin derivatives is not particularly restricted. The cyclodextrin may be any of α type, β type, γ type, δ type and ε type. The cyclodextrin derivatives may also be any of α type, β type, γ type, δ type and ε type. The cyclodextrin derivatives intend to be an amino form, a tosyl form, a methyl form, a propyl form, a monoacetyl form, a triacetyl form, a benzoyl form, a sulfonyl form, a monochlorotriazinyl form, and the like. More specific examples of the cyclodextrin and cyclodextrin derivatives that can be used in the present invention include cyclodextrin such as α-cyclodextrin (number of glucose: 6), β-cyclodextrin (number of glucose: 7) or γ-cyclodextrin (number of glucose: 8); and cyclodextrin derivatives such as dimethyl cyclodextrin, glucosyl cyclodextrin, 2-hydroxypropyl-α-cyclodextrin, 2, 6-di-O-methyl-α-cyclodextrin, 6-O-α-maltosyl-α-cyclodextrin, 6-O-α-D-glucosyl-α-cyclodextrin, hexakis (2,3,6-tri-O-acetyl)-α-cyclodextrin, hexakis (2,3,6-tri-O-methyl)-α-cyclodextrin, hexakis(6-O-tosyl)-α-cyclodextrin, hexakis(6-amino-6-deoxy)-α-cyclodextrin, hexakis(2,3-acetyl-6-bromo-6-deoxy)-α-cyclodextrin, hexakis(2,3,6-tri-O-octyl)-α-cyclodextrin, mono(2-O-phosphoryl)-α-cyclodextrin, mono[2, (3)-O-(carboxymethyl)]-α-cyclodextrin, octakis(6-O-t-butyldimethylsilyl)-α-cyclodextrin, succinyl-α-cyclodexrrin, glucuronylglucosyl-β-cyclodextrin, heptakis(2,6-di-O-methyl)-β-cyclodextrin, heptakis(2,6-di-O-ethyl)-β-cyclodextrin, heptakis(6-O-sulfo)-β-cyclodextrin, heptakis(2,3-di-O-acetyl-6-O-sulfo)-β-cyclodextrin, heptakis(2,3-di-O-methyl-6-O-sulfo)-β-cyclodextrin, heptakis(2,3,6-tri-O-acetyl)-β-cyclodextrin, heptakis(2,3,6-tri-O-benzoyl)-β-cyclodextrin, heptakis(2,3,6-tri-O-methyl)-β-cyclodextrin, heptakis(3-O-acetyl-2,6-di-O-methyl)-β-cyclodextrin, heptakis(2,3-O-acetyl-6-bromo-6-deoxy)-β-cyclodextrin, 2-hydroxyethyl-β-cyclodextrin, hydroxypropyl-β-cyclodextrin, 2-hydroxypropyl-β-cyclodextrin, (2-hydroxy-3-N,N,N-trimethylamino)propyl-β-cyclodextrin, 6-O-α-maltosyl-β-cyclodextrin, methyl-β-cyclodextrin, hexakis(6-amino-6-deoxy)-β-cyclodextrin, bis(6-azido-6-deoxy)-β-cyclodextrin, mono(2-O-phosphoryl)-β-cyclodextrin, hexakis[6-deoxy-6-(1-imidazolyl)]-β-cyclodextrin, monoacetyl-β-cyclodextrin, triacetyl-β-cyclodextrin, monochlorotriazinyl-β-cyclodextrin, 6-O-α-D-glucosyl-β-cyclodextrin, 6-O-α-D-mantosyl-β-cyclodextrin, succinyl-β-cyclodextrin, sccinyl-(2-hydroxypropyl)-β-cyclodextrin, 2-carboxymethyl-β-cyclodextrin, 2-carboxyethyl-β-cyclodextrin, butyl-β-cyclodextrin, sulfopropyl-β-cyclodextrin, 6-monodeoxy-6-monoamino-β-cyclodextrin, silyl[(6-O-t-butyldimethyl)-2,3-di-O-acetyl]-β-cyclodextrin, 2-hydroxyethyl-γ-cyclodextrin, 2-hydroxypropyl-γ-cyclodextrin, butyl-γ-cyclodextrin, 3A-amino-3A-deoxy-(2AS, 3AS)-γ-cyclodextrin, mono-2-O-(p-toluenesulfonyl)-γ-cyclodextrin, mono-6-O-(p-toluenesulfonyl)-γ-cyclodextrin, mono-6-O-mesitylenesulfonyl-γ-cyclodextrin, octakis(2,3,6-tri-O-methyl)-γ-cyclodextrin, octakis(2,6-di-O-phenyl)-γ-cyclodextrin, octakis(6-O-t-butyldimethylsilyl)-γ-cyclodextrin and octakis(2,3,6-tri-O-acetyl)-γ-cyclodextrin. The cyclic molecules of cyclodextrin or the like described above can be used alone or as mixtures of two or more kinds. Of the cyclic molecules, α-cyclodextrin, β-cyclodextrin, γ-cyclodextrin, and their derivatives are preferred, and α-cyclodextrin and their derivatives are particularly preferably used from the standpoint of clathration.

The blocking group is not particularly limited so long as it is a group that is arranged at both terminals of the straight chain molecule and can hold the state that the cyclic molecule clathrates the straight chain molecule.

Examples of the group include a group having "bulkiness" and a group having "ionicity". The term "group" used herein means various groups including a molecule group and high molecule group. Examples of the group having "bulkiness" include a spherical group and a side wall-shaped group.

The ionicity of a group having "ionicity" and the ionicity of the cyclic molecule have influence on each other. For example, repulsion of those each other can hold the state that the cyclic molecule has been skewered with the straight chain molecule.

Specific examples of the blocking group include dinitrophenyl groups such as 2,4-dinitrophenyl group and 3,5-dinitrophenyl group, cyclodextrin groups, adamantane groups, trityl groups, fluorescein groups, pyrene groups, and their derivatives or modified compounds.

The rotaxane may be that the cyclic molecule has a modifying group, and the example thereof includes modified rotaxane having (—CO(CH$_2$)$_5$OH) group as a modifying group by caprolactone. Specifically, the rotaxane is rotaxane having (—CO(CH$_2$)$_5$OH) group, wherein the cyclic molecule is cyclodextrin, a part or the whole of hydroxyl groups of the cyclodextrin is modified with a modifying group and the modifying group is a modifying group by caprolactone. More specifically, the rotaxane is rotaxane having (—CO(CH$_2$)$_5$OH) group that is a modifying group by caprolactone and bonds to a —O—C$_3$H$_5$—O— group of the cyclic molecule.

The fine particles of rotaxane covered with silica used in the present invention are that at least apart of the surface of the rotaxane is covered with silica and the rotaxane and the silica are chemically bonded to each other.

As the fine particles of rotaxane covered with silica, commercially available products can be used. Examples of the commercially available products specifically include SH2400B-0501 and SH2400B-2001 manufactured by Advanced Soft Materials.

The content of the fine particles is preferably 10 to 100 parts by mass, more preferably 20 to 90 parts by mass and still more preferably 20 to 80 parts by mass, per 100 parts by mass of the rubber component.

The content of the rotaxane is preferably 9.8 to 98 parts by mass, more preferably 19.6 to 88.2 parts by mass and still more preferably 19.6 to 78.4 parts by mass, per 100 parts by mass of the rubber component.

The average particle diameter of the fine particles is not particularly limited, but is preferably 1 to 50 μm, more preferably 1 to 30 μm and still more preferably 1 to 20 μm. When the average particle diameter of the fine particles is in the above range, the effect by the rotaxane is easy to be obtained. In the present description, the average particle diameter means a particle diameter in cumulative value 90% (90% volume particle diameter (D90)) in particle size distribution (volume basis) obtained by measuring by a laser diffraction/scattering method using a laser diffraction particle size analyzer "SALD-2200" manufactured by Shimadzu Corporation and a red semiconductor laser (wavelength 680 nm) as a light source.

The rubber composition according to the present embodiment contains at least one of carbon black and silica as an inorganic filler. In other words, the inorganic filler used may be carbon black alone, may be silica alone or may be a mixture of carbon black and silica. In the case where silica is added, apart from the fine particles, the silica does not chemically bond to rotaxane and disperses in the rubber composition, apart from the fine particles. Therefore, the silica added can be distinguished from the silica covering the rotaxane.

The total content of the fine particles, the carbon black and the silica (excluding silica covering rotaxane) is 70 to 150 parts by mass, preferably 80 to 140 parts by mass and more preferably 80 to 120 parts by mass, per 100 parts by mass of the rubber component. The total content of the fine particles, the carbon black and the silica (excluding silica covering rotaxane) can be paraphrased as the total content of the rotaxane, the carbon black and the silica (including silica covering rotaxane). When the total content of the fine particles, the carbon black and the silica (excluding silica covering rotaxane) is in the above range, the improvement effect in snow performance is easy to be obtained while maintaining reinforcing property.

The carbon black is not particularly limited and its conventional various kinds can be used. The content of the carbon black is preferably 5 to 30 parts by mass, more preferably 5 to 20 parts by mass and still more preferably 5 to 15 parts by mass, per 100 parts by mass of the rubber component.

The silica is not particularly limited, and wet silica such as wet precipitated silica or wet gelled silica is preferably used. The content of the silica (including silica covering rotaxane) is preferably 10 to 90 parts by mass and more preferably 10 to 80 parts by mass, per 100 parts by mass of the rubber component from the standpoints of the balance of tan δ of a rubber and reinforcing property.

The rubber composition according to the present embodiment achieves excellent snow performance while maintaining reinforcing property as compared with the conventional rubber composition for a tire, by adding the fine particles of rotaxane covered with silica and at least one of carbon black and silica so as to be predetermined contents. The mechanism is not sure, but it is assumed as follows. Slippage occurs between the cyclic molecule of the rotaxane and the straight chain molecule thereof when stretching the rubber, by chemical interaction between the silica on the surface of the cyclic molecule of the rotaxane and the rubber component (hereinafter referred to as slide ring effect). The rubber is well stretched even by small stress by the slide ring effect. As a result, it is considered that flexibility of the rubber composition is improved and this contributes to snow performance. Furthermore, the silica on the surface of the fine particles functions as a reinforcing filler. It is therefore considered that the reinforcing property can be maintained by setting the total amount of the fine particles, the carbon black and the silica to a predetermined content.

Use of the fine particles can bond the rotaxane and the rubber component through the silica on the surface of the fine particles. As a result, the fine particles can be added to unvulcanized rubber as same as in other additives, the addition of the rotaxane when synthesizing the rubber component is not required and the modification of the rubber component is not required.

The rubber composition according to the present embodiment may further contain a silane coupling agent such as sulfide silane or mercaptosilane. The content of the silane coupling agent is preferably 2 to 20 parts by mass per 100 parts by mass of the total amount of the fine particles and the silica added as a reinforcing filler.

In addition to the components described above, compounding chemicals that are generally used in rubber industries, such as a process oil, zinc oxide, stearic acid, a softener, a plasticizer, a wax, an age resister, a vulcanizing agent and a vulcanization accelerator, can be appropriately added to the rubber composition according to the present embodiment in a general range.

Examples of the vulcanizing agent include sulfur components such as powdered sulfur, precipitated sulfur, colloidal sulfur, insoluble sulfur and highly dispersible sulfur. The content of the vulcanizing agent is preferably 0.1 to 10 parts by mass and more preferably 0.5 to 5 parts by mass, per 100 parts by mass of the rubber component. The content of the vulcanization accelerator is preferably 0.1 to 7 parts by mass and more preferably 0.5 to 5 parts by mass, per 100 parts by mass of the rubber component.

The rubber composition according to the present embodiment can be produced by kneading the necessary components according to the conventional method using a mixing machine which is usually used, such as Banbury mixer, a kneader or rolls. Specifically, the rubber composition can be prepared by adding other additives excluding a vulcanizing agent and a vulcanization accelerator to a rubber component together with the fine particles of rotaxane covered with silica, followed by mixing, in a first step and adding a vulcanizing agent and a vulcanization accelerator to the mixture obtained, followed by mixing, in a final step.

The rubber composition thus obtained can be applied to a tread part, a sidewall part and the like of pneumatic tires of various sizes for various uses, such as tires for passenger cars, large-sized tires for trucks, buses and the like, and can be applied to a tread part in a preferred embodiment. The rubber composition can manufacture a pneumatic tire according to the conventional method, by, for example, forming the rubber composition into a predetermined shape by extrusion processing, combining the formed product with other parts, and then vulcanization molding the resulting assembly at, for example, 130 to 190° C.

The kind of the pneumatic tire according to the present embodiment is not particularly limited, and examples of the pneumatic tire include various tires such as tires for passenger cars and tires for heavy load used in trucks and buses, as described above.

EXAMPLES

Examples of the present invention are described below, but the present invention is not construed as being limited to those examples.

Banbury mixer was used. Components excluding a vulcanization accelerator and sulfur were added and mixed according to the formulations (parts by mass) shown in Table 1 below in a first step (discharge set temperature: 160° C.). A vulcanization accelerator and sulfur were added to and mixed with the mixture obtained above in a final step (discharge set temperature: 90° C.). Thus, a rubber composition was prepared.

The details of each component in Table 1 are as follows.
Natural rubber: RSS#3
SBR1: TUFDENE 1834 manufactured by Asahi Kasei Corporation
SBR2: HPR340, terminal alkoxyl group and amino group-modified solution-polymerized styrene-butadiene rubber, manufactured by JSR Corporation
BR: BR150B manufactured by Ube Industries Ltd.
Carbon black: SEAST KH manufactured by Tokai Carbon Co., Ltd.
Silica: NIPSIL AQ manufactured by Tosoh Corporation
Fine particle 1: SH2400B-0501 (straight chain molecule: polyethylene glycol, cyclic molecule: cyclodextrin having modifying group by caprolactone, blocking group: adamantane group, the surface being covered with silica), average particle diameter: 7.4 μm, true specific gravity (He substitution method): 1.18 g/cc, silica content: 2%, manufactured by Advanced Soft Materials
Fine particle 2: SH2400B-2001 (straight chain molecule: polyethylene glycol, cyclic molecule: cyclodextrin having modifying group by caprolactone, blocking group: adamantane group, the surface being covered with silica), average particle diameter: 20 μm, true specific gravity (He substitution method): 1.16 g/cc, silica content: 2%, manufactured by Advanced Soft Materials Silane coupling agent: Si69 manufactured by Evonik Japan
Oil: PROCESS NC140 manufactured by JXTG Nippon Oil & Energy Corporation
Zinc oxide: Zinc Oxide #2 manufactured by Mitsui Mining & Smelting Co., Ltd.
Stearic acid: LUNAC S-20 manufactured by Kao Corporation
Wax: OZOACE 0355 manufactured by Nippon Seiro Co., Ltd.
Age resister: NOCLUC 6C manufactured by Ouchi Shinko Chemical Industrial Co., Ltd.
Sulfur: POWDERED SULFUR manufactured by Tsurumi Chemical Industry Co., Ltd.
Vulcanization accelerator: SOXINOL CZ manufactured by Sumitomo Chemical Co., Ltd.

Hardness and snow performance of each rubber composition obtained were evaluated using each test piece having a predetermined size obtained by vulcanizing each rubber composition at 160° C. for 30 minutes. The evaluation methods are as follows.

Hardness: Hardness was measured according to JIS K7215. Hardness was indicated as an index as the value of Comparative Example 1 that is the formulation of the conventional rubber composition for a tire being 100. Hardness is low as the index is small. It was evaluated that reinforcing property was maintained when the index was 95 to 105.

Snow performance: Four test tires were mounted on a passenger car. ABS was operated from 60 km/hr running on a snowy road and a braking distance was measured when speed was reduced to 20 km/hr (average value of n=10). Inverse number of a braking distance was indicated by an index as the value of Comparative Example 1 that is the formulation of the conventional rubber composition for a tire being 100. Braking distance is short as the index is large, and large index indicates excellent snow performance.

TABLE 1

|  | Com. Ex. 1 | Com. Ex. 2 | Com. Ex. 3 | Com. Ex. 4 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|---|---|
| Natural rubber | 30 | 30 | 30 | 30 | 30 | 30 | 30 | 30 | 30 | 30 | 30 | 30 | 30 | 30 |
| SBR 1 | 50 | 50 | 50 | 50 | 50 | 50 | — | — | 50 | 50 | 50 | 50 | 50 | 50 |
| SBR 2 | — | — | — | — | — | — | 50 | 50 | — | — | — | — | — | — |
| BR | 20 | 20 | 20 | 20 | 20 | 20 | 20 | 20 | 20 | 20 | 20 | 20 | 20 | 20 |
| Carbon black | 10 | 10 | — | 10 | 10 | 10 | 10 | 10 | 10 | 10 | 10 | 10 | 10 | 10 |
| Silica | 90 | 90 | — | 70 | 50 | 50 | 50 | 50 | 70 | 70 | 20 | 20 | 60 | 70 |
| Fine particles 1 | — | 70 | 110 | — | 40 | — | 40 | — | 20 | — | 70 | — | — | — |
| Fine particles 2 | — | — | — | — | — | 40 | — | 40 | — | 20 | — | 70 | 10 | 40 |
| Rotaxane compound | — | — | — | 20 | — | — | — | — | — | — | — | — | — | — |
| Silane coupling agent | 9.0 | 16.0 | 11.0 | 9.0 | 9.0 | 9.0 | 9.0 | 9.0 | 9.0 | 9.0 | 9.0 | 9.0 | 7.0 | 11.0 |
| Oil | 30 | 30 | 30 | 30 | 30 | 30 | 30 | 30 | 30 | 30 | 30 | 30 | 30 | 30 |
| Zin oxide | 2.0 | 2.0 | 2.0 | 2.0 | 2.0 | 2.0 | 2.0 | 2.0 | 2.0 | 2.0 | 2.0 | 2.0 | 2.0 | 2.0 |
| Stearic acid | 2.0 | 2.0 | 2.0 | 2.0 | 2.0 | 2.0 | 2.0 | 2.0 | 2.0 | 2.0 | 2.0 | 2.0 | 2.0 | 2.0 |
| Wax | 2.0 | 2.0 | 2.0 | 2.0 | 2.0 | 2.0 | 2.0 | 2.0 | 2.0 | 2.0 | 2.0 | 2.0 | 2.0 | 2.0 |
| Age resister | 2.0 | 2.0 | 2.0 | 2.0 | 2.0 | 2.0 | 2.0 | 2.0 | 2.0 | 2.0 | 2.0 | 2.0 | 2.0 | 2.0 |
| Sulfur | 2.0 | 2.0 | 2.0 | 2.0 | 2.0 | 2.0 | 2.0 | 2.0 | 2.0 | 2.0 | 2.0 | 2.0 | 2.0 | 2.0 |
| Vulcanization accelerator | 1.5 | 1.5 | 1.5 | 1.5 | 1.5 | 1.5 | 1.5 | 1.5 | 1.5 | 1.5 | 1.5 | 1.5 | 1.5 | 1.5 |
| Total amount of carbon black, silica and fine particles | 100 | 170 | 110 | 80 | 100 | 100 | 100 | 100 | 100 | 100 | 100 | 100 | 80 | 120 |
| Hardness | 100 | 130 | 80 | 84 | 98 | 98 | 98 | 98 | 100 | 100 | 96 | 96 | 95 | 106 |
| Snow performance | 100 | 70 | 125 | 117 | 110 | 109 | 109 | 107 | 105 | 106 | 115 | 116 | 120 | 103 |

Rotaxane compound: SH3400P (straight chain molecule: polyethylene glycol, cyclic molecule: cyclodextrin having modifying group by caprolactone, blocking group: adamantane group, the surface being not covered with silica), manufactured by Advanced Soft Materials The results obtained are shown in Table 1 above. From the comparison between Comparative Example 1 and Examples 1 to 10, it is seen that when the total content of the fine particles, the carbon black and the silica (excluding silica covering rotaxane) is contained in the range of 70 to 150 parts by mass per 100 parts by mass of the rubber component, excellent snow performance is obtained while maintaining reinforcing property, as compared with the conventional formulation.

From the comparison between Examples 1 to 10 and Comparative Example 2, it is seen that when the total content of the fine particles, the carbon black and the silica (excluding silica covering rotaxane) exceeds 150 parts by mass per 100 parts by mass of the rubber component, reinforcing property cannot be maintained and snow performance is poor.

From the comparison between Examples 1 to 10 and Comparative Example 3, it is seen that when the fine particles are contained and the carbon black and silica are not contained, reinforcing property cannot be maintained.

From the comparison between Example 6 and Comparative Example 4, it is seen that when the rotaxane compound that is not covered with silica is used, reinforcing property cannot be maintained.

The rubber composition of the present invention can be used in various tires of passenger cars, light trucks, buses and the like.

What is claimed is:

1. A rubber composition for a tire, comprising:
fine particles of rotaxane having a straight chain molecule, a cyclic molecule clathrating the straight chain molecule and blocking groups arranged at both terminals of the straight chain molecule such that the cyclic molecule does not desorb from the straight chain molecule, covered with silica,
a rubber component comprising styrene-butadiene rubber, and
at least one of carbon black and silica,
wherein the total content of the fine particles, the carbon black and the silica (excluding silica covering rotaxane) is 70 to 150 parts by mass per 100 parts by mass of the rubber component.

2. The rubber composition for a tire according to claim 1, wherein the rotaxane has a modifying group by caprolactone in the cyclic molecule.

3. The rubber composition for a tire according to claim 1, wherein the fine particles have an average particle diameter of 1 to 50 μm.

4. The rubber composition for a tire according to claim 2, wherein the fine particles have an average particle diameter of 1 to 50 μm.

5. The rubber composition for a tire according to claim 1, wherein the content of the fine particles is 10 to 100 parts by mass per 100 parts by mass of the rubber component.

6. The rubber composition for a tire according to claim 2, wherein the content of the fine particles is 10 to 100 parts by mass per 100 parts by mass of the rubber component.

7. The rubber composition for a tire according to claim 3, wherein the content of the fine particles is 10 to 100 parts by mass per 100 parts by mass of the rubber component.

8. The rubber composition for a tire according to claim 4, wherein the content of the fine particles is 10 to 100 parts by mass per 100 parts by mass of the rubber component.

9. The rubber composition for a tire according to claim 1, wherein the content of the rotaxane is 9.8 to 98 parts by mass per 100 parts by mass of the rubber component.

10. The rubber composition for a tire according to claim 2, wherein the content of the rotaxane is 9.8 to 98 parts by mass per 100 parts by mass of the rubber component.

11. The rubber composition for a tire according to claim 3, wherein the content of the rotaxane is 9.8 to 98 parts by mass per 100 parts by mass of the rubber component.

12. The rubber composition for a tire according to claim 4, wherein the content of the rotaxane is 9.8 to 98 parts by mass per 100 parts by mass of the rubber component.

13. The rubber composition for a tire according to claim 5, wherein the content of the rotaxane is 9.8 to 98 parts by mass per 100 parts by mass of the rubber component.

14. The rubber composition for a tire according to claim 6, wherein the content of the rotaxane is 9.8 to 98 parts by mass per 100 parts by mass of the rubber component.

15. The rubber composition for a tire according to claim 7, wherein the content of the rotaxane is 9.8 to 98 parts by mass per 100 parts by mass of the rubber component.

16. The rubber composition for a tire according to claim 8, wherein the content of the rotaxane is 9.8 to 98 parts by mass per 100 parts by mass of the rubber component.

17. A winter tire using the rubber composition for a tire according to claim 1 in a tread part.

* * * * *